US00RE45494E

(19) United States
(12) Reissued Patent
Rosenblum et al.

(10) Patent Number: US RE45,494 E
(45) **Date of Reissued Patent: *Apr. 28, 2015**

(54) SYSTEM AND METHODS FOR FLUID DROP EJECTION

(75) Inventors: Robert Rosenblum, Norwich, VT (US); Melvin L. Biggs, Norwich, VT (US); Edward R. Moynihan, Plainfield, NH (US)

(73) Assignee: FUJIFILM Dimatix, Inc., Lebanon, NH (US)

( * ) Notice: This patent is subject to a terminal disclaimer.

(21) Appl. No.: 13/043,367

(22) Filed: Mar. 8, 2011

Related U.S. Patent Documents

Reissue of:
(64) Patent No.: 7,637,592
Issued: Dec. 29, 2009
Appl. No.: 11/441,865
Filed: May 26, 2006

U.S. Applications:
(63) Continuation-in-part of application No. 10/946,355, filed on Sep. 20, 2004, now Pat. No. 7,484,836, which is an application for the reissue of Pat. No. 7,637,592.

(51) Int. Cl.

| | |
|---|---|
| ***B41J 29/38*** | (2006.01) |
| ***B41J 2/14*** | (2006.01) |
| ***B41J 2/16*** | (2006.01) |
| ***B41J 2/17*** | (2006.01) |
| ***B41J 2/045*** | (2006.01) |

(52) U.S. Cl.
CPC ..... *B41J 2/04526* (2013.01)

(58) Field of Classification Search
USPC ..... 347/5, 9–13, 84, 47, 40–43, 70–71; 239/102.2; 29/890.1
See application file for complete search history.

(56) References Cited

U.S. PATENT DOCUMENTS

| | | | | |
|---|---|---|---|---|
| 4,131,899 | A | 12/1978 | Christou | |
| 4,550,326 | A * | 10/1985 | Allen et al. | 347/44 |
| 4,621,273 | A * | 11/1986 | Anderson | 347/40 |
| 4,901,093 | A | 2/1990 | Ruggiero et al. | |
| 5,640,184 | A | 6/1997 | Moynihan et al. | |
| 5,731,827 | A * | 3/1998 | Mantell et al. | 347/40 |
| 5,757,391 | A | 5/1998 | Hosington | |
| 5,757,400 | A | 5/1998 | Hosington | |

(Continued)

FOREIGN PATENT DOCUMENTS

| | | |
|---|---|---|
| EP | 0 627 314 | 12/1994 |
| JP | 02-001323 | 1/1990 |

(Continued)

OTHER PUBLICATIONS

Office action dated Feb. 22, 2011 issued in Japanese Application No., 4 pgs.

(Continued)

*Primary Examiner* — Lam S Nguyen
(74) *Attorney, Agent, or Firm* — Fish & Richardson P.C.

(57) ABSTRACT

A drop ejection device includes three or more orifices disposed in a two-dimensional pattern in a nozzle plate, a fluid conduit coupled to the three or more orifice, and an actuator configured to actuate the fluid in the fluid conduit to eject separate fluid drops out of the three or more orifices, the fluid drops remaining separate in flight.

24 Claims, 6 Drawing Sheets

(56) References Cited

U.S. PATENT DOCUMENTS

| | | | | |
|---|---|---|---|---|
| 5,889,538 | A | 3/1999 | Kishimoto et al. | |
| 6,083,411 | A | 7/2000 | Nakayama et al. | |
| 6,084,609 | A | 7/2000 | Manini et al. | |
| 6,089,698 | A | 7/2000 | Temple et al. | |
| 6,099,108 | A * | 8/2000 | Weber et al. | 347/43 |
| 6,312,120 | B1 | 11/2001 | Ando et al. | |
| 6,474,786 | B2 | 11/2002 | Percin et al. | |
| 6,592,203 | B1 | 7/2003 | Bates et al. | |
| 6,779,861 | B2 | 8/2004 | Mori | |
| 7,040,016 | B2 | 5/2006 | Bergstrom et al. | |
| 7,484,836 | B2 * | 2/2009 | Moynihan | 347/84 |
| 2002/0175220 | A1 | 11/2002 | Pence | |
| 2003/0201246 | A1 | 10/2003 | Hardisty et al. | |
| 2004/0050974 | A1 | 3/2004 | Lee et al. | |
| 2005/0146561 | A1 | 7/2005 | Bibl et al. | |
| 2006/0061636 | A1 | 3/2006 | Moynihan | |

FOREIGN PATENT DOCUMENTS

| | | | |
|---|---|---|---|
| JP | 07-032596 | A | 2/1995 |
| JP | 10-315463 | A | 12/1998 |
| JP | 2002-154199 | | 5/2002 |
| JP | 2002-154199 | A | 5/2002 |
| JP | 2002-248774 | A | 9/2002 |

OTHER PUBLICATIONS

International Search Report and Written Opinion of the International Searching Authority, International Application Serial No. PCT/US2005/033858, Feb. 6, 2006, 13 pp.

International Search Report and Written Opinion of the International Searching Authority, International Application Serial No. PCT/US2007/069688, Feb. 29, 2008,8 pp.

* cited by examiner

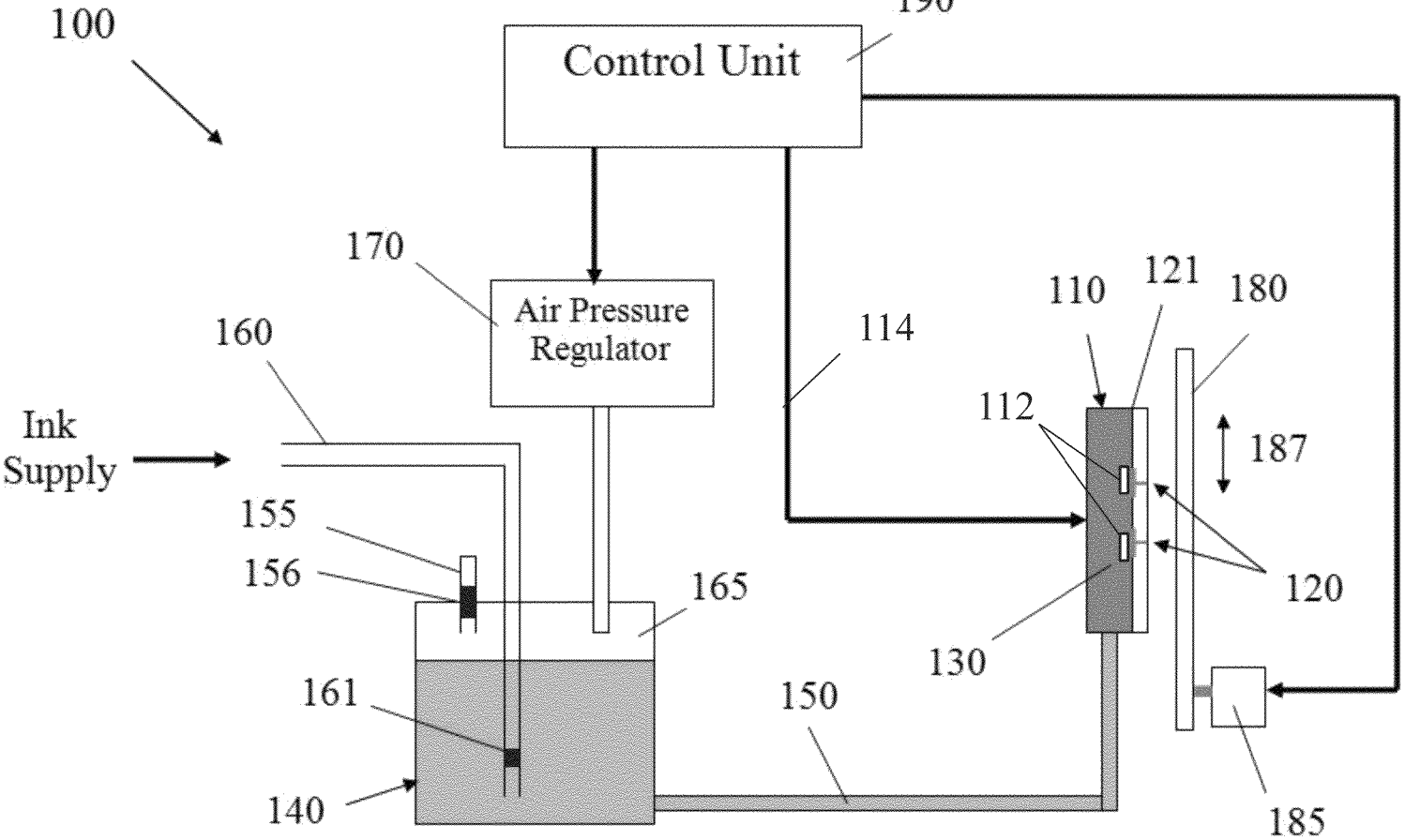
Figure 1
AMENDED

SYSTEM AND METHODS FOR FLUID DROP EJECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a continuation-in-part application of and claims priority to U.S. application Ser. No. 10/946,355, filed on Sep. 20, 2004, issued as U.S. Pat. No. 7,484,836.*

TECHNICAL FIELD

This application relates to the field of fluid ejection.

BACKGROUND

Fluid delivery devices such as ink jet printers typically include a fluid path from a fluid supply to a nozzle path. The nozzle path terminates in a nozzle opening from which fluid drops are ejected. The fluid drop ejection is controlled by pressurizing fluid in the fluid path with an actuator, which may be, for example, a piezoelectric deflector, a thermal bubble jet generator, or an electrostatically deflected element. A typical fluid delivery head has an array of fluid paths with corresponding nozzle openings and associated actuators, and drop ejection from each nozzle opening can be independently controlled. In the example of a drop-on-demand ink jet print head, each actuator is fired to selectively eject an ink drop at a specific pixel location of an image as the print head and a printing substrate are moved relative to one another. The fluid in the fluid conduit of a fluid delivery system is usually kept at a negative pressure to keep the fluid from oozing over the nozzle plate. In addition, the fluid nozzles are required to be primed by the fluid for proper fluid drop ejection.

SUMMARY

In one aspect, a drop ejection device includes three or more orifices disposed in a two-dimensional pattern in a nozzle plate, a fluid conduit coupled to the three or more orifices, and an actuator configured to actuate the fluid in the fluid conduit to eject separate fluid drops out of the three or more orifices, the fluid drops remaining separate at least until impinging a receiver.

In another aspect, a drop ejection device has a first orifice in a nozzle plate, a plurality of second orifices surrounding the first orifice such that the first orifice and the plurality of second orifices are distributed in a two-dimensional pattern in the nozzle plate, a fluid conduit coupled to the first orifice and the plurality of second orifices, and an actuator configured to actuate the fluid in the fluid conduit to eject separate fluid drops out of at least one of the first orifice and the plurality of second orifices, the fluid drops remaining separate in flight.

In yet another aspect, a drop ejection device includes a first orifice in a nozzle plate, a plurality of second orifices surrounding the first orifice such that the first orifice and the plurality of second orifices are distributed in a two-dimensional pattern in the nozzle plate, a fluid conduit coupled to the first orifice and the plurality of second orifices, and an actuator configured to actuate the fluid in the fluid conduit to eject separate fluid drops out of at least one of the first orifice and the plurality of second orifices, the fluid drops remaining separate at least until impinging a receiver.

Implementations of the system may include one or more of the following. The ejection of the separate fluid drops out of the three or more orifices can be actuated by a single electronic pulse received by the actuator. The actuator can be configured to eject fluid drops of different drop volumes out of at least one of the three or more orifices in the group. The actuator can be configured to eject the separate fluid drops substantially simultaneously out of the three or more orifices. Separate meniscuses can be formed at the three or more orifices. The three or more orifices can have substantially the same dimensions. The three or more orifices can have different dimensions. The three or more orifices can comprise a first orifice and a plurality of second orifices surrounding the first orifice. The opening of the first orifice can be wider than the openings of the second orifices. The actuator can include a piezoelectric transducer or a heater. The three or more orifices can be in the shape of a circle, a triangle, or a polygon. The openings of the three or more orifices can have a width in the range from 1 μm to 100 μm. The three or more orifices can have bubble pressure over 6 inch wg.

Embodiments may include one or more of the following advantages. The ink jet printing system can reliably provide ink drops having variable volumes. The drop volume of the ink drops can be controlled. The system can produce a mist of aerosol ink droplets that can be sprayed onto an ink substrate. The system can be suitable to a wide range of applications such as aerosol drug delivery, air moisturizing, and painting. The fluid delivery system can be fabricated using silicon-based fabrication technologies. The system and methods can be compatible with piezoelectric, thermal and MEMS-based ink jet printing systems. The system and methods can also be applicable to water-based inks, solvent-based inks, hot-melt inks, dye or pigment based inks, solvent or aqueous solutions.

The details of one or more embodiments are set forth in the accompanying drawings and in the description below. Other features, objects, and advantages of the invention will become apparent from the description and drawings, and from the claims.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a block diagram of the fluid ejection having fluid ejection nozzles.

Like reference symbols in the various drawings indicate like elements.

DETAILED DESCRIPTION

Figure 2A:
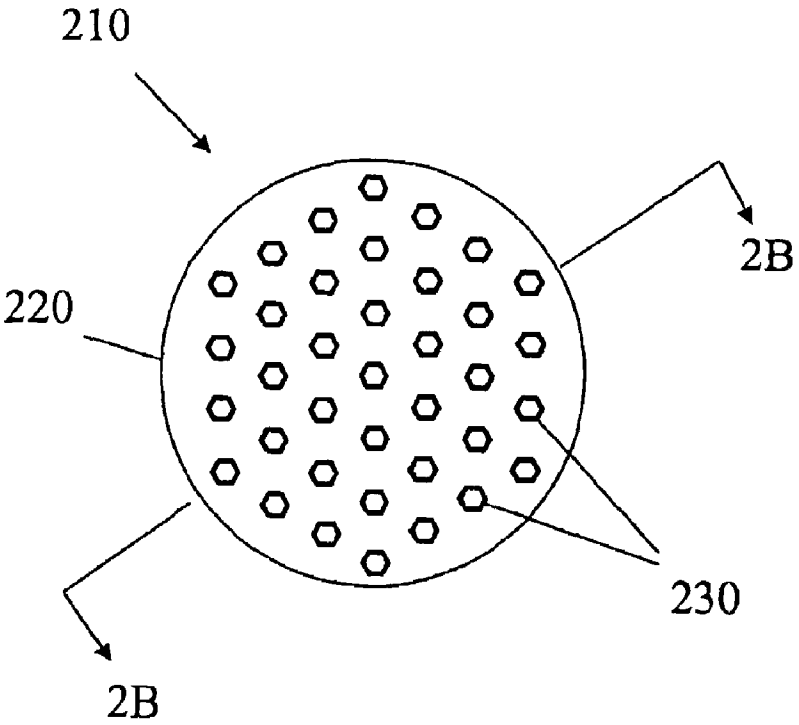
FIG. 2A is a top view of one implementation of a fluid ejection nozzle.

FIG. 1 illustrates an example of a fluid delivery system. An ink jet printing system 100 includes an ink jet print head module 110 having a plurality of ink nozzles 120 typically arranged in arrays on a nozzle plate 121, a fluid conduit 130 for supplying ink to the ink jet print head module 110, an ink reservoir 140 for storing the ink to be supplied to the fluid conduit 130, and an ink passage 150 that provides fluid connection between the ink reservoir 140 and the fluid conduit 130. During printing, ink drops are ejected from the ink nozzles 120 under the control of an electronic control unit 190 in response to input image data to form an image pattern of ink dots on an ink substrate 180. The ink jet printing system 100 can include a plurality of ink nozzles 120 each associated with one or more ink ejection actuators *112*. The ink ejection actuators *112* can include a piezoelectric transducer, a heater, or an MEMS transducer device. The ink jet printing system 100 can further comprise an electronic selector that can select the ink ejection actuator each associated with one or more ink nozzles 120 from which the fluid drop will be ejected.

As shown in FIGS. 2A, 2B, 3A, 3B, and 4, each ink nozzle (e.g., 210) comprises a plurality of closely distributed orifices (e.g., 230). Ink nozzles are separated by distances significantly larger than those between neighboring orifices within each ink nozzle. The ink fluid contained in the fluid conduit 130 is ejected from the orifices corresponding to each ink nozzle 120 under the control of the control unit 190. The ink fluid ejected from the orifices remains as separate ink drops after the ejection at least while emerging from the orifices 230 and while in flight to the substrate. The ejected ink drop can vary in volume in response to different drive voltage waveforms applied to the ink ejection actuator by the electronic control unit 190.

The ink jet print head module 110 can exist in the form of piezoelectric, thermal, and MEMS based ink jet print heads, and other types of ink actuation mechanisms. For example, Hoisington et al. U.S. Pat. No. 5,265,315, the entire content of which is hereby incorporated by reference, describes a print head that has a semiconductor print head body and a piezoelectric actuator. The print head body can be made of silicon, which can be etched to define a fluid conduit. Nozzle openings can be defined by a separate nozzle plate 121, which is attached to the silicon body. The piezoelectric actuator has a layer of piezoelectric material, which changes geometry, or bends, in response to an applied voltage. The bending of the piezoelectric layer pressurizes ink in a fluid conduit that supplies the ink to the ink orifices.

Other ink jet print heads are disclosed in commonly assigned U.S. patent application Ser. No. 10/189,947, U.S. Patent Publication No. US20040004649A1, titled "Printhead", filed on Jul. 3, 2002, and U.S. patent application Ser. No. 10/962,378, titled "Print head with thin membrane", filed Oct. 8, 2004. The content of these related patent applications and publications are herein incorporated by reference. U.S. patent application Ser. No. 10/962,378 discloses a print head having a monolithic semiconductor body with an upper face and a lower face. The body defines a fluid path including a fluid conduit, and a nozzle opening. The nozzle opening is defined in the lower face of the body and the nozzle flow path includes an accelerator region. A piezoelectric actuator is associated with the fluid conduit. The actuator includes a piezoelectric layer having a thickness of about 50 micron or less.

The ink reservoir 140 includes an ink-feeding path 160 having an ink filter 161 that supplies ink to the ink reservoir 140. The ink reservoir 140 also has an air inlet 155 having an air filter 156 that allows the ink level to vary in the ink reservoir 140.

Ink types compatible with the described ink jet printing system include water-based inks, solvent-based inks, and hot melt inks. The ink fluids may include colorants such as a dye or a pigment. The fluids also may not include any colorant. Other fluids compatible with the system may include polymer solutions, gel solutions, solutions containing particles, low molecular-weight molecules, flavors, nutrients, biological fluids, or electronic fluids.

The hydrostatic pressure in fluid conduit 130, the ink reservoir 140, and ink passage 150 needs to be controlled for proper ink jet printing and head maintenance operations. Insufficient hydrostatic pressure at the ink jet nozzles 120 can cause the ink meniscus at the nozzles to retract within the ink jet nozzles 120. On the other hand, excessive hydrostatic pressure at the ink jet nozzles 120 can cause the ink to leak from the ink jet nozzles 120, producing ink oozing on the nozzle plate 121.

The pressure of air in the space 165 over the fluid in the ink reservoir 140 is typically controlled to keep the pressure at the nozzles slightly below atmospheric pressure (e.g. at −1 inch to −4 inches of water). The air pressure in the space 165 is regulated by an air pressure regulator 170 that can pump air from the space 165 under the control of the control unit 190.

The ink jet printing system 100 can also include a mechanism 185 that transports an ink substrate 180 along a direction 187. In one embodiment, the ink jet print head module 110 can move in reciprocating motion driven by a motor via an endless belt. The direction of the motion is often referred to as the fast scan direction. A second mechanism can transport the ink substrate 180 along a second direction (commonly referred as the slow scan direction) that is perpendicular to the first direction. During the ink jet printing operations, the ink jet print head module 110 disposes ink drops to form a swath of ink dots on the ink substrate 180. In another embodiment, a page-wide ink jet print head module 110 is formed by a print head bar or an assembly of print head modules. The ink jet print head module 110 remains still during printing while the ink receiving media is transported along the slow scan direction under the ink jet print head module 110. The ink jet system and methods are compatible with different print head arrangements known in the art. For example, the system and methods are applicable to a single pass ink jet printer with offset ink jet modules disclosed in the commonly assigned U.S. Pat. No. 5,771,052, the content of which is incorporated by reference herein.

As described previously, the ink pressure in the ink conduit of an ink jet printing system is kept negative to keep the ink from oozing on the nozzle plate, especially during the high-acceleration movement of the ink jet print head. In addition, the ink nozzles are required to be primed by the ink fluid for proper ink drop ejection.

The ability of ink to prime an opening such as an ink nozzle is determined by a property called bubble pressure. The bubble pressure is a function of the nozzle diameter (or opening dimensions) and the surface tension of the ink. As shown in Table I, the bubble pressure decreases as the nozzle diameter increases. When the magnitude of the negative pressure in the ink fluid is higher than the bubble pressure of a nozzle, the ink will pull back from the nozzle. Air bubbles will be ingested into the ink in fluid conduit 130, and prevent proper priming of the nozzle. In other words, the magnitude of the negative ink pressure has to be smaller than the bubble pressure.

TABLE I

| Fluid Bubble Pressure* as a Function of the Orifice Diameter | |
|---|---|
| Orifice Diameter (microns) | Meniscus Pressure (inch wg) |
| 30 | 16.1 |
| 40 | 12.0 |
| 50 | 9.6 |
| 60 | 8.0 |
| 70 | 6.9 |
| 80 | 6.0 |
| 90 | 5.4 |
| 100 | 4.8 |
| 110 | 4.4 |
| 120 | 4.0 |
| 130 | 3.7 |
| 140 | 3.4 |

*At ink surface tension of 30 dynes/cm.

In one aspect, the ink jet print head module 110 in ink jet printing system 100 provides ink nozzles having high bubble pressure while still being able to deliver a large ink drop volume. In another aspect, the increase of drop volume and the decrease of the nozzle bubble pressure are decoupled.

In one embodiment, FIG. 2A illustrates a top view of an ink nozzle 210 on the nozzle plate 121 compatible with the ink jet print head module 110. The ink nozzle 210 defines a nozzle region 220 comprising a group of three or more orifices 230. The orifices 230 are disposed in a two-dimensional pattern (i.e. they are not distributed in a linear array). The two-dimensional pattern can include a hexagonal lattice as shown in FIG. 2A, a square lattice, etc. The two-dimensional pattern can be symmetric to the center of the ink nozzle 210. The orifices 230 can be disposed in a compact formation within a substantially circular area defined by the nozzle region 220. The orifices 230 are sufficiently separate and a drive voltage [waveforms] *waveform 114* is selected, such that the ink drops ejected from the orifices 230 remain distinct and separate, at least while emerging from the orifices 230 and while in flight to the substrate. In one implementation, the orifices 230 in the group are in a hexagon shape having substantially the same dimensions. Alternatively, the group of orifices may be of other shapes such as triangles, squares, or circles. The orifices in each group can have the same or different dimensions. The nozzle region 220 typically spans a range of 1 μm to 300 μm. The orifice opening dimensions are typically in the range from 1 μm to 100 μm, preferably in the range of 3 μm to 50 *μm*.

The distance between the adjacent orifices 230 are typically similar or larger than the opening dimensions of the orifices 230 such that the ejected ink drops can remain separate.

In one embodiment, the ejected droplets form a mist or an aerosol in the air. The aerosols of ink droplets can be sprayed onto the ink substrate 180. To enable fluid droplets to be suspended in the air for a useful period of time, the weights and thus the sizes of the fluid droplets need to be small. The sizes of the ejected droplets are controlled in the disclosed system by the opening dimensions of the orifices and the waveform of the electric pulse applied to the actuators.

The disclosed system is applicable to a wide range of fluid delivery applications. In one embodiment, a paint fluid can be ejected to form an aerosol and sprayed on a substrate such as the body of an automobile. An electrostatic field can be applied to assist the migration of the aerosol paint droplets in the air to the surface of the automobile body. In another embodiment, the disclosed system is applicable to aerosol drug delivery, air moisturizing, and painting. The size of the mist droplets can be precisely controlled by the waveform of the electric pulses transmitted from the control unit to the fluid delivery head.

Figure 2B:
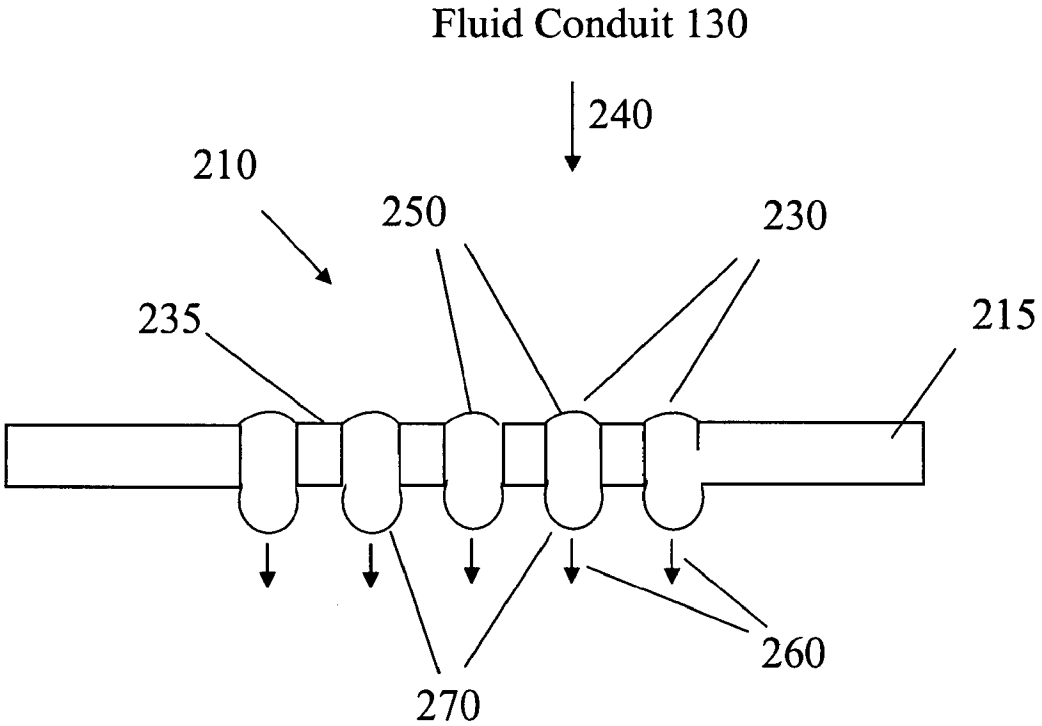
FIG. 2B illustrates a cross-sectional view of the fluid ejection nozzle of Figure A.

FIG. 2B illustrates a cross-sectional view of the ink nozzle 210 of FIG. 2A along the line of 2B-2B. The ink nozzle 210 is formed in a nozzle plate 215. The cross section of the ink nozzle 210 includes a group of orifices 230 separated by separation walls 235. The ink fluid is supplied from the fluid conduit 130 along the direction 240. Separate meniscuses 250 are formed in the orifices 230. In non-ejection states, the meniscuses 250 form concave shapes curving toward the direction of the fluid conduit 130 due to the negative pressure applied to the ink body. The negative ink pressure holds the ink meniscuses 250 at the inner ends of the ink orifices 230 and prevents the ink from oozing over the nozzle plate 215.

Before ink ejection, an outward pressure wave is generated in the ink fluid by the ink actuator under the control of the control unit 190. The control unit 190 is electronically coupled to the ink actuator and is configured to transmit electric pulses to enable the ink actuator to actuate the fluid in the fluid conduit to eject fluid drops out of the orifices 230. The ink fluid bounded by ink surfaces 270 is pushed outward along direction 260.

The ink drops are then broken off from each of the ink orifices 230. The ink drops remain separate in the air in the aerosol form or will land on an ink substrate 180. The widths of the separation walls 235 are substantially equal or wider than the widths of the orifices 230 such that the fluid ejected from the orifices 230 can stay separate. The volume of the ink drops ejected from individual orifices can depend on a number of factors such as the dimensions of the orifices 230, the viscosity and the surface tension of the ink fluid, and the waveform applied to the actuators by the control unit 190. In one embodiment, the ink drops ejected from the orifices 230 are actuated by a single electric pulse transmitted from the control unit 190 to the actuator. In other words, the individual orifices 230 do not need to be addressed individually electronically, which reduces complexity of the design and the fabrication of the print head module. The volumes of the ink drop can vary as a function of the waveforms of the electric pulses transmitted from the control unit 190 to the actuator.

The orifices 230, the nozzle plate 215 and the fluid conduit 130 can be formed in a silicon substrate. The orifices are fabricated using one or more of etching, laser ablation, and electroforming.

The bubble pressures in the ink nozzle 210 are determined by the ink surface tension and the dimensions of the orifices 230. In comparison, a large single-opening nozzle is required if the same ink drop is ejected from one nozzle having one opening. The bubble pressures of the orifices 230 can thus be significantly higher than the bubble pressure of the single-opening nozzle. The bubble pressures of the orifices 230 can be designed to be above a predetermined ink pressure. For example, as shown in Table 1, orifices at diameters of 50 μm or smaller can result in bubble pressures above 8 inch wg at a surface tension of 30 dyne/cm, no matter how large an ink drop is ejected. The total volume of the ink drops ejected from the orifices 230 can be flexibly increased by scaling up the number of the orifices 230. The volume of ink drop ejected from each orifice can be varied by varying the waveforms applied to the ink actuator from the control unit 190.

Figure 3A:
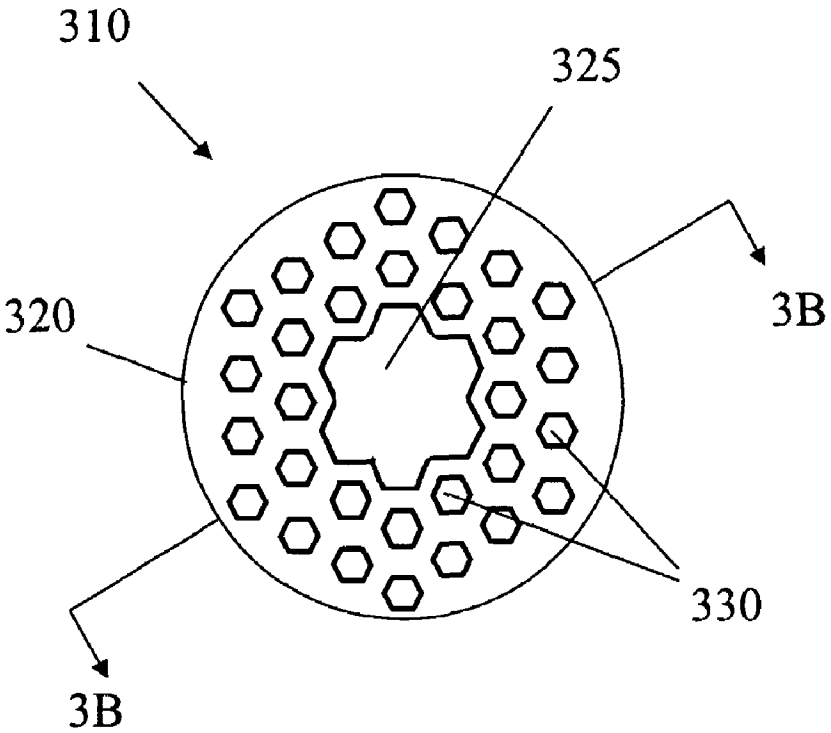
FIG. 3A is a top view of another implementation of a fluid ejection nozzle.

In another embodiment, FIG. 3A illustrates a top view of another implementation of an ink nozzle 310 compatible with the ink jet print head module 110. The ink nozzle 310 defines a nozzle region 320 comprising a first orifice 325 in the center and a plurality of second orifices 330 surrounding the first orifice 325. The first orifice 325 in the center and the second orifices 330 are disposed in a two-dimensional pattern, which can include a hexagonal lattice, a square lattice, etc. The first orifice 325 in the center and the second orifices 330 can locate at the lattice points wherein the larger first orifice 325 can occupy more than one lattice period. The two-dimensional pattern can be symmetric to the center of the ink nozzle 310. The orifices 325, 330 can be disposed in a compact formation within a substantially circular area defined by the nozzle region 320. The orifices 325 and 330 can take the shape of hexagons, triangles, a square, a circle, or a polygon, etc. The orifices 330 can have substantially the same dimensions whereas the orifice 325 has a wider dimension. The nozzle region 220 typically spans in a range of 1 μm to 300 μm. The orifice opening dimensions are typically in the range of 1 μm to 100 μm, such as 3 μm to 50 μm.

Figure 3B:
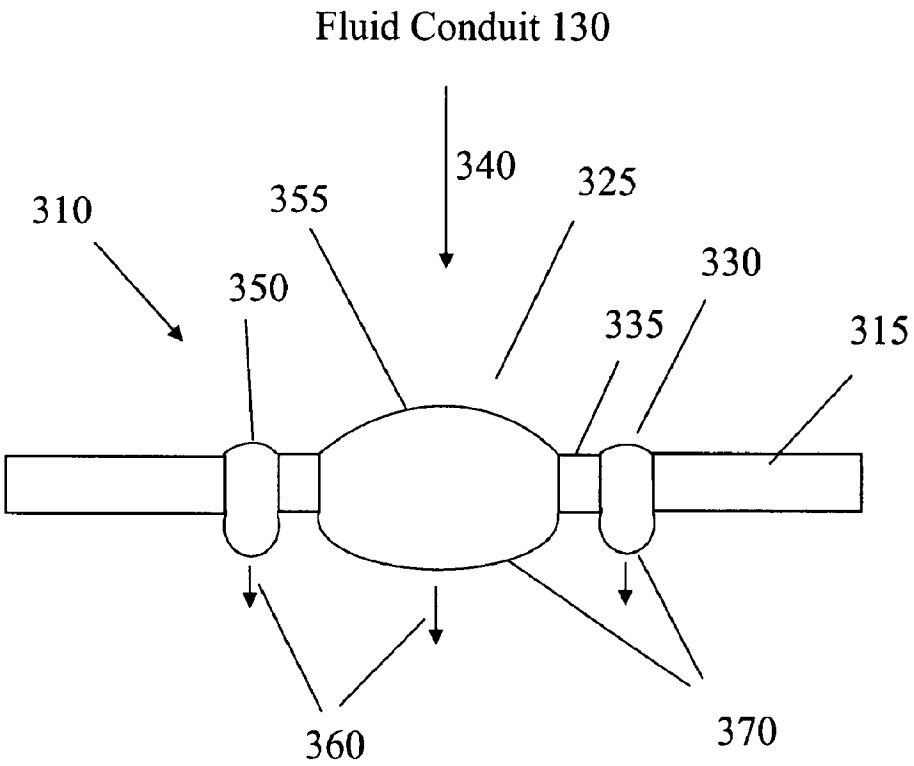
FIG. 3B illustrates a cross-sectional view of the fluid ejection nozzle of Figure A.

FIG. 3B illustrates a cross-sectional view of the ink nozzle 310 of FIG. 3A along 3B-3B. The ink nozzle 310 is formed in a nozzle plate 315. The cross section of the ink nozzle 310 includes the orifice 325 and orifices 330 separated by separation walls 335. The ink fluid is supplied from the fluid conduit 130 along the direction 340. In non-ejection states, separate meniscuses 350 and 355 are formed in the orifice 325 and orifices 330. The meniscuses 350 and 355 are in concave shapes curving toward the direction of the fluid conduit 130 as a result of the negative pressure applied to the ink body. The negative ink pressure holds the ink meniscuses 350, 355 at the inner ends of the ink orifices 325, 330 and prevents the ink from oozing over the nozzle plate 315. Before ink ejection, an outward pressure wave is generated in the ink fluid by the ink actuator under the control of the control unit 190. The ink fluid is pushed outward along direction 360 and breaks from the ink orifices 325, 330. The ejected ink drops remain separate in the air in the form of aerosol or land on the ink substrate 180. The widths of the separation walls 335 are wide enough such that the fluid drops ejected from the orifices 325 and 330 can stay as separate ink drops.

The wider orifice 325 serves several functions in comparison to the ink nozzle 210 in which the orifices are substantially equal. First, the orifice 325 produces a larger ejected ink fluid in the center of the nozzle region 320. Second, the orifice 325 has a lower bubble pressure than those of orifices 330. The waveform applied to the ink actuator by the control unit 190 can thus be manipulated so that ink is ejected only from the orifice 325 but not from orifices 330. The ability to eject a smaller ink drop is very desirable especially for high-resolution ink printing applications. The orifices 325 and 330 of different dimensions and the nozzle plate 315 can be formed in a silicon substrate. The orifices are fabricated using one or more of etching, laser ablation, and electroforming. For example, fabrication techniques disclosed in commonly assigned U.S. Pat. No. 5,265,315, US Patent Publication No. US20040004649A1, titled "Printhead", filed on Jul. 3, 2002, and U.S. patent application Ser. No. 10/962,378, titled "Print head with thin membrane", filed Oct. 8, 2004. The content of these patent applications and publications are herein incorporated by reference.

Figure 4:
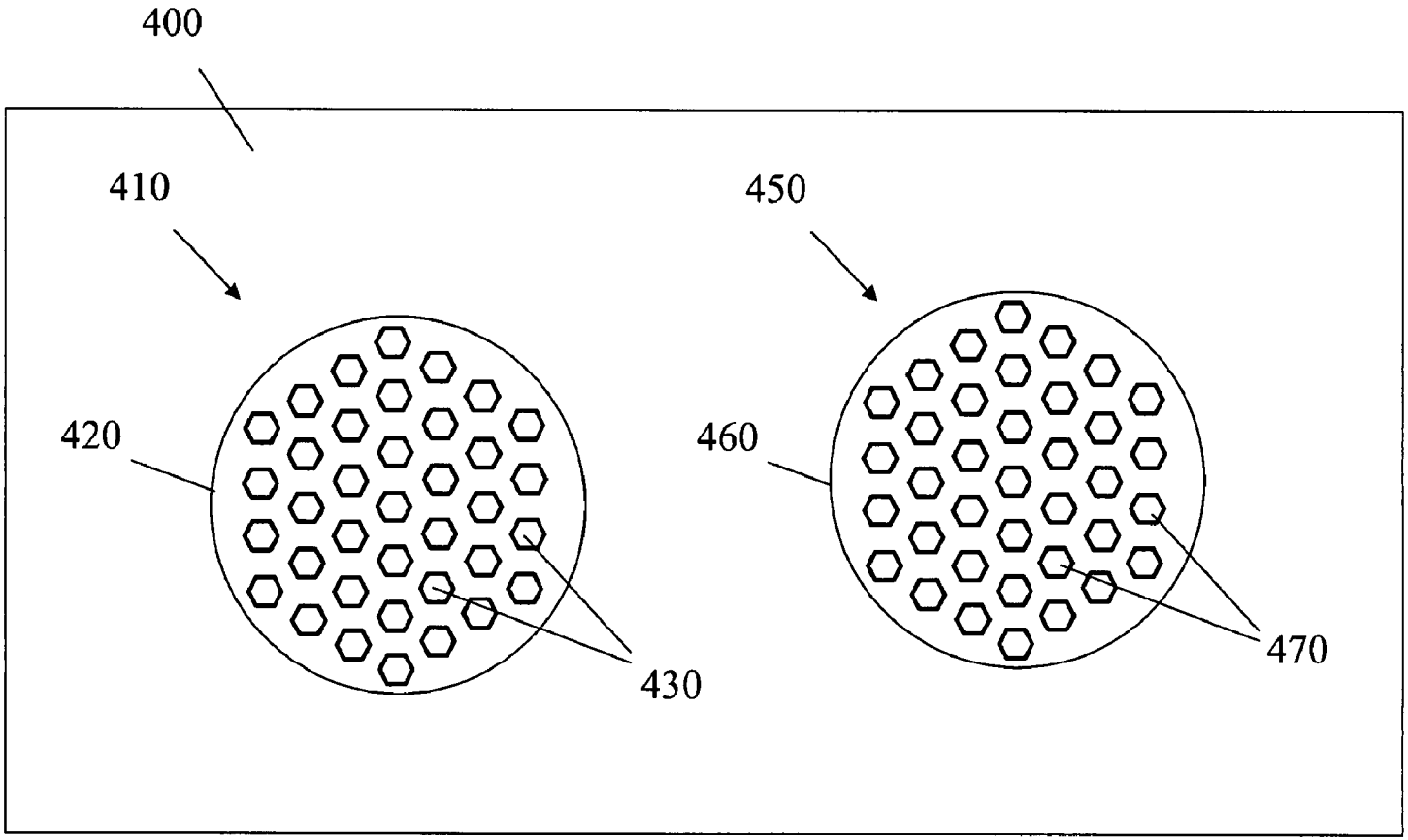
FIG. 4 is a top view of a plurality of fluid ejection nozzles each comprising a plurality of fluid ejection orifices.

In another embodiment, the print head can include a plurality of ink nozzles 410, 450 each comprising groups of orifices 430, 470 on a nozzle plate 400 as shown in FIG. 4. The ink nozzle 410 includes a group of ink orifices 430 distributed in a nozzle region 420. Similarly, the ink nozzle 450 includes a group of ink orifices 470 disposed in a nozzle region 460. The spacing between adjacent ink nozzles 410, 450 can be significantly larger than the distances between neighboring ink orifices 430, 470 within each nozzle group. The ink drops ejected from the orifices in each nozzle group are actuated by one or more common actuators that are capable actuating the fluid in the fluid conduit that is coupled to the orifices in the nozzle group.

The ink nozzles 410, 450 can form linear arrays or other patterns for effective depositions of ink drops. The nozzles in linear arrays can be aligned orthogonal or oblique to the fast scan direction of the print head module 110 relative to the ink substrate 180. Different ink nozzles each comprising groups of orifices can be optimized to be suitable for ejecting ink drops of different volumes.

In an implementation, the nozzles having a plurality of orifices can be used to eject a mist of fluid similar to an aerosol spray. The volume of the fluid ejected from individual orifices can depend on a number of factors such as the dimensions of the orifices, the viscosity and the surface tension of the fluid, and the waveform applied to the actuators by the control unit. These factors can also influence the period of time in which a fluid is suspended in air.

The ejection of a fluid mist can have several applications, such as applying a coating or administering a dose of medicine to be inhaled. For example, a predetermined amount of medicinal fluid is ejected as a mist into the air and a patient inhales the mist of medicinal fluid. The medicine can be in the form of a liquid or a solid suspended in a carrier fluid. The waveform applied to the actuators can be a single electric pulse or a multipulse waveform.

The ink jet printing system disclosed provides reliable performance to provide ink drops having variable volumes. The drop volumes of the ink drops can be controlled by varying the waveforms of the electric pulse applied to the actuators. The fluid delivery system can be fabricated using silicon-based fabrication technologies. The disclosed system and methods are compatible with piezoelectric, thermal and MEMS-based ink jet printing systems. The disclosed system and methods are also applicable to water-based inks, solvent-based inks, hot-melt inks, dye or pigment based inks, solvent or aqueous solutions.

What is claimed is:

1. A drop ejection device, comprising:

three or more orifices disposed in a two-dimensional pattern in a nozzle plate, wherein the three or more orifices form a nozzle;

a fluid conduit coupled to the three or more orifices;

a single actuator corresponding to the nozzle and configured to actuate fluid in the fluid conduit to eject separate fluid drops out of the three or more orifices, the fluid drops remaining separate in flight; and a controller configured to apply a first waveform to the actuator, the first waveform causing the fluid to be ejected from the nozzle but from less than all of the three or more orifices of the nozzle, and to apply a second waveform to the actuator, the second waveform causing the fluid to be ejected from all of the three or more orifices of the nozzle.

2. The drop ejection device of claim 1, wherein the ejection of the separate fluid drops out of the three or more orifices are actuated by a single electronic pulse received by the actuator.

3. The drop ejection device of claim 1, wherein the actuator is configured to eject fluid drops of different drop volumes out of at least one of the three or more orifices.

4. The drop ejection device of claim 1, wherein the actuator is configured to eject the separate fluid drops substantially simultaneously out of the three or more orifices.

5. The drop ejection device of claim 1, wherein separate meniscuses are formed at the three or more orifices.

6. The drop ejection device of claim 1, wherein the three or more orifices have substantially the same dimensions.

7. The drop ejection device of claim 1, wherein the three or more orifices have different dimensions.

8. The drop ejection device of claim 1, wherein the three or more orifices comprise a first orifice and a plurality of second orifices surrounding the first orifice.

9. The drop ejection device of claim 8, wherein the opening of the first orifice is wider than the openings of the second orifices.

10. The drop ejection device of claim 1, wherein the actuator includes a piezoelectric transducer or a heater.

11. The drop ejection device of claim 1, wherein the three or more orifices are in the shape of a circle, a triangle, or a polygon.

12. The drop ejection device of claim 1, wherein the openings of the three or more orifices have a width in the range from 1 micron to 100 microns.

13. The drop ejection device of claim 1, wherein the three or more orifices have bubble pressure over 6 inch wg when the fluid has a surface tension of 30 dynes/cm.

14. A drop ejection device, comprising:

a plurality of groups of orifices in a nozzle plate, wherein at least one group includes three or more orifices disposed in a two-dimensional pattern in a nozzle plate;

a fluid conduit coupled to the three or more orifices;

a single actuator corresponding to the group and configured to actuate fluid in the fluid conduit to eject separate fluid drops out of the three or more orifices, the fluid drops remaining separate at least until impinging upon a receiver; and a controller configured to apply a first waveform to the actuator, the first waveform causing the fluid to be ejected from the group but from less than all of the three or more orifices of the group, and to apply a second waveform to the actuator, the second waveform causing the fluid to be ejected from all of the three or more orifices of the group.

15. The drop ejection device of claim 14, wherein the ejections of the separate fluid drops out of the three or more orifices are actuated by a single electronic pulse received by the actuator.

16. The drop ejection device of claim 14, wherein the actuator is configured to eject fluid drops of different drop volumes out of at least one of the three or more orifices in the group.

17. The drop ejection device of claim 14, wherein separate meniscuses are formed at the three or more orifices in the group.

18. A drop ejection device, comprising:

a first orifice in a nozzle plate;

a plurality of second orifices surrounding the first orifice such that the first orifice and the plurality of second orifices are distributed in a two-dimensional pattern in the nozzle plate, wherein the first orifice and plurality of second orifices form a nozzle;

a fluid conduit coupled to the first orifice and the plurality of second orifices;

a single actuator corresponding to the nozzle and configured to actuate fluid in the fluid conduit to eject separate fluid drops out of at least one of the first orifice and the plurality of second orifices, the fluid drops remaining separate at least until impinging upon a receiver; and a controller configured to apply a first waveform to the actuator, the first waveform causing the fluid to be ejected from the nozzle but from less than all of the orifices of the nozzle, and to apply a second waveform to the actuator, the second waveform causing the fluid to be ejected from all of the orifices of the nozzle.

19. The drop ejection device of claim 18, wherein the first orifice has a wider opening than the openings of the second orifices.

20. The drop ejection device of claim 18, wherein separate meniscuses are formed at the first orifice and the plurality of second orifices.

21. The drop ejection device of claim 18, wherein the actuator is configured to eject separate fluid drops of different drop volumes out of one or more of the first orifice and the plurality of second orifices.

22. The drop ejection device of claim 18, wherein the actuator is configured to eject fluid drops out of the first orifice without ejecting fluid drops out of the plurality of the second orifices.

23. The drop ejection device of claim 18, wherein the actuator is configured to simultaneously eject separate fluid drops out of the first orifice and the plurality of the second orifices.

24. The drop ejection device of claim 18, wherein the opening of the first orifice is wider than the openings of the second orifices.

* * * * *

UNITED STATES PATENT AND TRADEMARK OFFICE

CERTIFICATE OF CORRECTION

PATENT NO. : RE45,494 E
APPLICATION NO. : 13/043367
DATED : April 28, 2015
INVENTOR(S) : Robert Rosenblum, Melvin L. Biggs and Edward R. Moynihan It is certified that error appears in the above-identified patent and that said Letters Patent is hereby corrected as shown below:

Title page,

Column 1, under U.S. Applications, after "7,484,836", delete ", which is an application for the reissue of Pat. No. 7,637,592"

Column 2, under Other Publications, after "Application No.", insert -- 2007-532651 --

Signed and Sealed this
Fifteenth Day of September, 2015

Michelle K. Lee

Michelle K. Lee
*Director of the United States Patent and Trademark Office*